May 7, 1929.  C. E. DEMING  1,711,724
JEWEL AND PIVOT GAUGE FOR WATCHMAKERS
Filed March 25, 1926
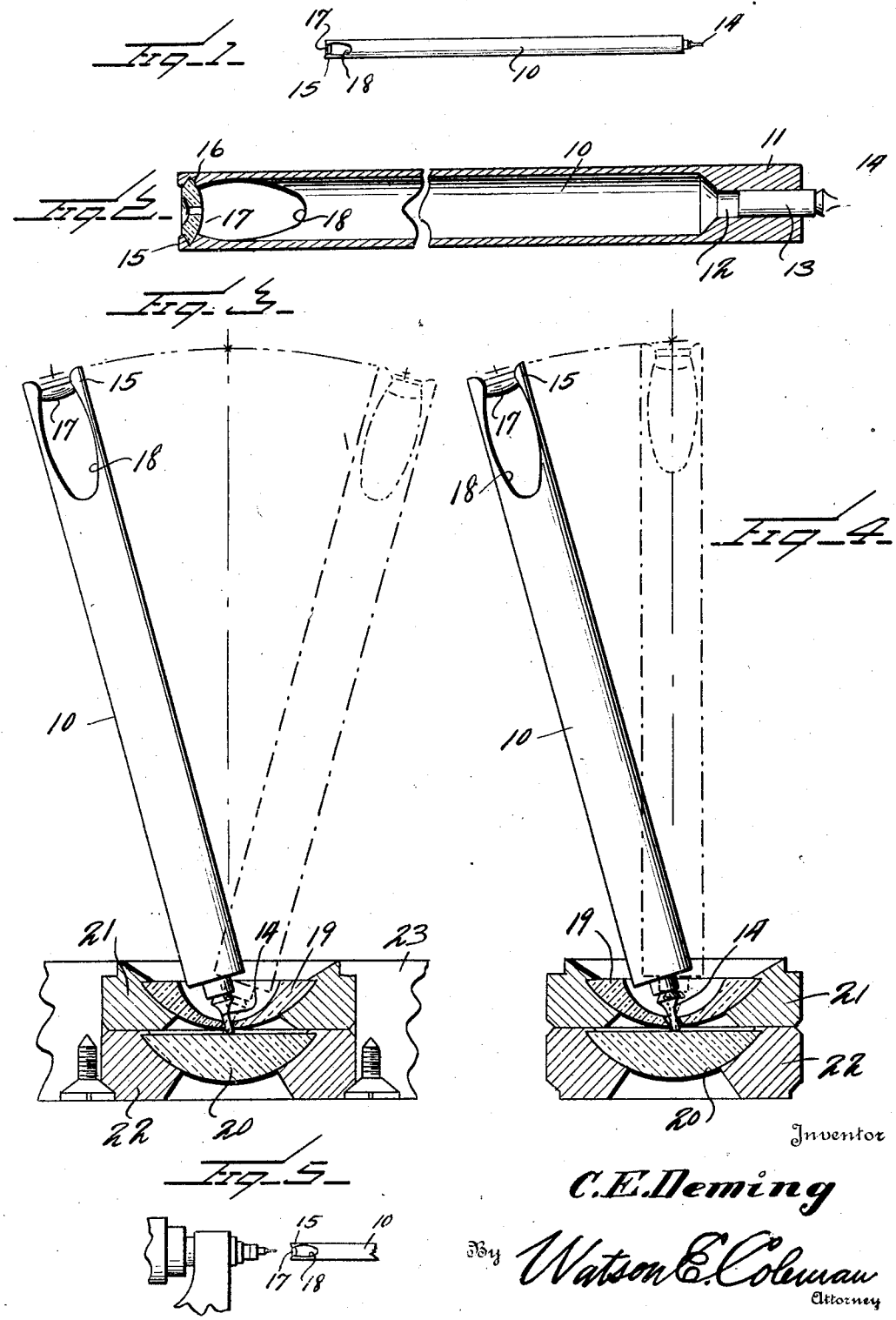
Inventor
C. E. Deming
By Watson E. Coleman
Attorney Patented May 7, 1929.

1,711,724

UNITED STATES PATENT OFFICE.

CHESTER E. DEMING, OF ORLANDO, FLORIDA.

JEWEL AND PIVOT GAUGE FOR WATCHMAKERS.

Application filed March 25, 1926. Serial No. 97,361.

This invention relates to devices for gauging and testing the holes in jewels used in watches and gauging the diameters of the pivots which operate in said jewels.

The general object of the invention is to provide a very simple gauge whereby the question as to whether or not a pivot of a certain definite diameter will properly fit within the bearing opening of a jewel may be determined, the gauge being further so constructed as to show whether this hole within the jewel has its axis disposed at a proper angle or not and as to whether the hole has a broken or irregular wall.

A further object is to provide a device of this character which carries at one end a pivot pin and at the other is so formed as to receive a testing jewel, the hole through which has approximately the same diameter as the pivot pin and which is further so constructed that both faces of the jewel may be seen and so that access may be had to that portion of the pivot pin projecting through the aperture in the jewel.

A still further object is to provide a device of this character which may be used in testing jewels in a watch or other part without removing the jewels therefrom, thus avoiding the difficulty of removing the jewel, properly supporting the jewel in tweezers or the like while examining it and eliminating the danger of losing the jewel.

Other objects and advantages will appear more fully hereinafter.

My invention is illustrated in the accompanying drawings wherein:—

Figure 1 is an elevation of my improved gauge about natural size;

Fig. 2 is an enlarged sectional view through the gauge;

Fig. 3 is a sectional view through a jewel of a watch showing the manner in which the gauge is used to determine the size of the aperture in the jewel;

Fig. 4 is a like view to Figure 3 but showing how the gauge is used for determining whether the aperture is coaxial with the jewel;

Fig. 5 is a fragmentary longitudinal section showing the manner in which the jewel end of the gauge is used where the balance staff is being reduced in a lathe.

My improved pivot pin and jewel gauge as illustrated in Figure 2 consists of a tubular shank designated 10 having any desired length or diameter, this shank at one end having its wall thickened as at 11 to provide a relatively small bore 12 within which the stock 13 of a pivot pin 14 is disposed and with the wall of which the stock is frictionally engaged.

The opposite end of the shank 10 is cut away to form two opposed transversely curved jaws 15, each of these jaws having a V-shaped groove 16 upon its inner face adapted to receive the circumferential edge of a jewel 17. Inward of this groove 16 the stock is cut away as at 18 so as to form a peep hole or sight opening by which to view a pivot pin inserted through the central opening of the jewel and projecting beyond the inner face of the jewel.

It is, of course, to be understood that there will be a set of gauges made up as above described, and that each gauge will have a jewel in one end having an opening corresponding in diameter with the diameter of the pivot pin carried by the other end of the gauge or shank and that each of these gauges in the set will have a pivot pin of different diameter and a jewel having a hole of different diameter from any other gauge of the set. The most common pivot sizes are sizes 9, 10, 11 and 12 but the ordinary jewel and pivot gauge has sizes ranging from No. 8 to No. 21, both as regards the jewels and the pivot pins.

In the ordinary jewel and pivot gauge, however, there is a plate having a series of bushings, each bushing having therein a jewel, the opening through each jewel differing in diameter from the diameter of any other jewel, and below this strip with the jewels is a strip having set therein a series of pivot pins also differing in diameter. If it be desired to see if a pivot pin which is to be selected for use in the watch has a diameter appropriate to a certain size of jewel the pivot pin is inserted within the jewel of the gauge in common use and if, on the other hand, a jewel is to be selected which fits a particular size of pivot pin, the jewel is taken up by tweezers and dropped over or upon the pins until the correct pin is found which will pass through the hole in the jewel. One of the objections to gauges of this character is that the jewels must be taken out of the watch or other parts and this is not only more or less a difficult operation but it requires very expert handling and very often the jewel is lost. Furthermore, if the jewel has a relatively large hole and fits too loosely upon one of the standard or gauging pivot pins this loose fit of the jewel on the pivot pin can only be disclosed by the use of a magnifying glass and the same is true with regard to fitting the extremity of the pivot pin which is being made or tested in any one of the jewels of the gauge. Thus, the matter of fit is largely a matter of eye and inasmuch as all the work must be done under a magnifying glass it is obvious that very serious errors in securing the right jewel to fit a pivot pin or securing a proper pivot pin to fit a jewel may be made under these circumstances.

In order to illustrate the manner in which the gauging device is to be used it is necessary to state certain circumstances of its operation. Thus, when a watchmaker wishes to fit a new balance staff to a watch the usual method is to take the balance jewels out and try the balance hole on a pivot pin on the new staff. He takes out both the "cock" and "foot" jewels and with tweezers tries the cock and foot hole jewel on their respective pivots of the staff he is fitting and he keeps trying in this manner until he gets the staff, the pivot of which fits the jewel properly. When the pivot pin properly fits a jewel it should just go through the jewel freely but not bind nor stick therein. In fine watches the pivot should only have a very little play or freedom in its jewel while in cheaper watches a little more play is permissible. The amount of this freedom is judged by each individual watchmaker by sight and by noting how much the jewel tilts sidewise when slipped over the pivot being tried. By experience he learns what size pivot should best fit the jewel of the watch but obviously there is considerable personal equation in this matter and a great many watchmakers use jewels too large for the best results. Ordinarily speaking the total amount of side play of a balance pivot in its jewel should not be more than 1/10th millimeter or 1/250th of an inch. The average watchmaker is not careful of his jewel and pivot fitting and often selects a jewel too large.

My improved gauge obviates this difficulty of fitting a pivot pin to a jewel or measuring a pivot pin which is being formed upon a lathe to fit a particular jewel by reason of the fact that as illustrated in Figure 2, the gauge is relatively long or has a relatively long shank and by inserting the pivot pin extremity of the gauge into the jewel as illustrated in Figure 3, the degree of play of the pivot pin within the jewel or the difference between the interior diameter of the jewel and the exterior diameter of the pin may be very easily noted by oscillating the gauge as shown in Figure 3. Inasmuch as the distance between the fulcrum formed by the jewel and the extremity of the gauge is relatively long, it is obvious that a very slight movement or play of the pivot pin within the hole of the jewel will be magnified as it were, or increased to a very great degree at the outer end of the pin. Thus, where the gauge is two inches long and its pivot is properly fitted in the jewel, the top of the gauge will ordinarily describe a circle of between 5/8 and 3/4 of an inch. If a watchmaker desired a greater freedom of action or a greater play he can easily test this play by carrying the upper end of the gauge in a circle and using a circle of larger radius than 5/8 or 3/4 of an inch. If, on the other hand less play is desired for a pivot pin within its jewel the gauge pivot pin of the corresponding size will be inserted in a jewel and tested until a jewel is found whose central opening will permit the gauge to swing in the circle of the correct diameter.

In Figure 3 I have illustrated the pivot pin of the gauge as being inserted in a jewel 19 having a central hole, the pivot pin, of course, bearing against the cap jewel 20, both of these jewels being mounted in suitable settings 21 and 22 disposed within the plate 23 of a watch, for instance. This gauge may be used either with jewels having holes with parallel side walls or jewels having "olive" holes such as illustrated in Figure 3, these last named jewels being used in higher grades of watches.

With this gauge it is not necessary to use a magnifying glass to judge whether the pivot pin properly fits the hole of the jewel and even an apprentice can judge a pivot and jewel fit correctly when once shown the method of operating the device.

With my gauge a jewel hole that is not circular is shown up at once because the top end of the gauge will not make a circle or tilt equally in different directions. This is very readily noted due to the mutiplication of error due to the length of the arm between the fulcrum for the gauge and the upper extremity thereof. Furthermore, this gauge may be used for determining whether the jewel hole is at right angles to the plate or other surface in which it is mounted, as illustrated in Figure 4. In this case the jewel hole 19$^a$ in the jewel 19 is on a slant and obviously the gauge can not swing in one direction though it can swing from a vertical position to a slanting position in the opposite direction and furthermore, the gauge readily follows in one direction to a slanting position. This gauge makes an imperfect jewel very easily observable and noted and much more easily determined than by the eye and magnifying glass. In the old way of testing a jewel to determine whether the hole was straight or slanting the jewel would have to be removed and examined by means of a strong magnifying glass and this examination would be complicated by reflections and the jars would be likely to affect the work bench.

With my improved gauge the side tilting of the top of the gauge will show immediately whether the hole is bored properly or not. Furthermore the jewels may be tested in place and not taken out. This necessity of taking out the jewels not only requires time but often the jewel is lost or mislaid. Where a wheel or train jewel of a watch is being tested the wheel pivot goes into this jewel on the opposite side of the jewel from the side into which the balance wheel pivot enters from the flat side away from the oil sink. In cases of this kind the jewel is gauged from the oil sink side and larger trial pivots and trial jewels would be necessary. So far I have described the use of the pivot pin and gauge. I will now describe the use of the jewel 17 set in the opposite end of the gauge from the pivot pin. The purpose of this jewel is not only for gauging the diameters of pivot pins to secure a pivot pin which is of the same size as the pivot pin 14 set in the same shank as the jewel but also to provide means particularly adapted for turning down the pivot pins. This portion of the gauge is particularly constructed so that the watchmaker can see the work done when turning the pivot of the balance wheel to the desired size without taking the staff from a lathe until completed. When a broken, bent or worn staff is removed from a watch it is first necessary to find the correct sized pivot needed for a new balance staff. To do this the gauge is stood upright with its pivot 14 in the opening of the balance jewel which is in the watch movement to be repaired. The size of the pivot needed is judged by the side tilting of the upper part of the gauge as was heretofore described. Thus it may be found out whether the watch takes a number 9, 10, 11 or 12 pivot. A new staff is then picked out having this size pivot by fitting the pivot within the opening of the gauge jewel 17. When it is necessary, as is often the case, to turn down a pivot in the lathe to the desired size, just how the work is coming on can be readily determined by stopping the lathe and slipping the gauge jewel over the pivot. By oscillating the gauge it is possible to determine just how much play the new pivot will have in the old jewel and the gauge permits the pivot of the balance staff to be observed so that the operator may know just when to stop grinding, turning or polishing. With my gauge any one with a little practice can take measurements from the watch to be repaired without taking the jewels out of it and in lathe work there is no necessity of taking the balance staff out of the chuck until finished. This is of advantage inasmuch as after a balance staff has been taken from a chuck it is difficult to replace it and get it true. With this device the gauge is slipped on the pivot pin in the lathe endwise, at right angles to the jewel and, therefore, there is no chance of twisting or bending the pivot or, where a pivot is being inserted in a jewel, cracking the jewel, which is quite likely to happen where jewels are held by tweezers. The advantage of this is that the hand of the operator is in direct line with the work and there is, therefore, much less danger to the pivot or the jewel with this end to end fitting than when an attempt is made to fit a jewel over a pivot in the lathe from four to six inches to one side of this line of centers. When a jewel is supported in tweezers for a "try-on" fit to the pivot pin being made, there is a sidewise action secured. This is off the central line of the work and the work is likely to give the tweezers a twisting or rocking motion that will injure either the pivot or the jewel.

It will be understood that the jewel 17 is simply sprung into the gauge between the jaws thereof and held there by the spring tension of the jaws. Thus the jewel can be easily replaced if broken. The hole 18 permits polishing of the extremity of the pivot when the tip end barely comes through the hole of the jewel and thus one can secure a finished and polished pivot that fits before taking it from the lathe. This is a very decided advantage over taking the work out of the lathe and having to rechuck it.

The gauge may be made of any suitable material but ordinarily hollow brass wire will be used but hard rubber, celluloid, or any other tubular material consistent with strength may be used. Ordinarily the tube or shank will have a diameter of about 3 millimeters for watch balance pivots and a length of about 2 inches while the pivot point will be made of steel or other metal. While an unset jewel 17 is preferably used a metal member having the proper sized aperture could be used in place of 17. By the construction which I have described no screws are required to hold the jewel in place and a new jewel can be readily replaced if necessary.

While I have described certain methods of using this gauge I do not wish to be limited thereto as it is obvious that it might be used for other work analogous to that I have described and for other parts of a watch.

It is an essential feature of my invention that the jewel or equivalent member 17 should have a hole therethrough of a diameter nearly equal to the diameter of the pivot pin at the opposite end of the gauge, the aperture through the jewel being, however, just enough larger so that if the pivot were pulled out of the gauge and tried in the jewel 17 of the same gauge, the pivot pin would properly fit into the jewel 17. If the hole in jewel 17 was exactly the size of the pivot pin 14 of the same gauge, there would be no freedom, as for instance, a freedom of 1/10 millimeter, and the pivot pin would not quite enter the jewel 17. Thus when the pivot pin at one end of the gauge is used for determining an aperture of a jewel, the pivot pin to fit said jewel may be readily found by fitting it into the aperture in the corresponding jewel 17 on the same gauge.

I claim:—

A tool for watchmakers comprising a straight, tubular shank, one end of the shank being formed with openings extending longitudinally of the shank and extending to the extreme end thereof to thereby provide opposed resilient jaws, and a centrally perforated jewel permanently mounted between said jaws, the openings permitting the inspection of a pivot pin inserted through the opening in the jewel.

In testimony whereof I hereunto affix my signature.

CHESTER E. DEMING.